Feb. 19, 1946.  J. C. DOBLER  2,395,173
LOADING AND UNLOADING APPARATUS
Filed Sept. 22, 1944
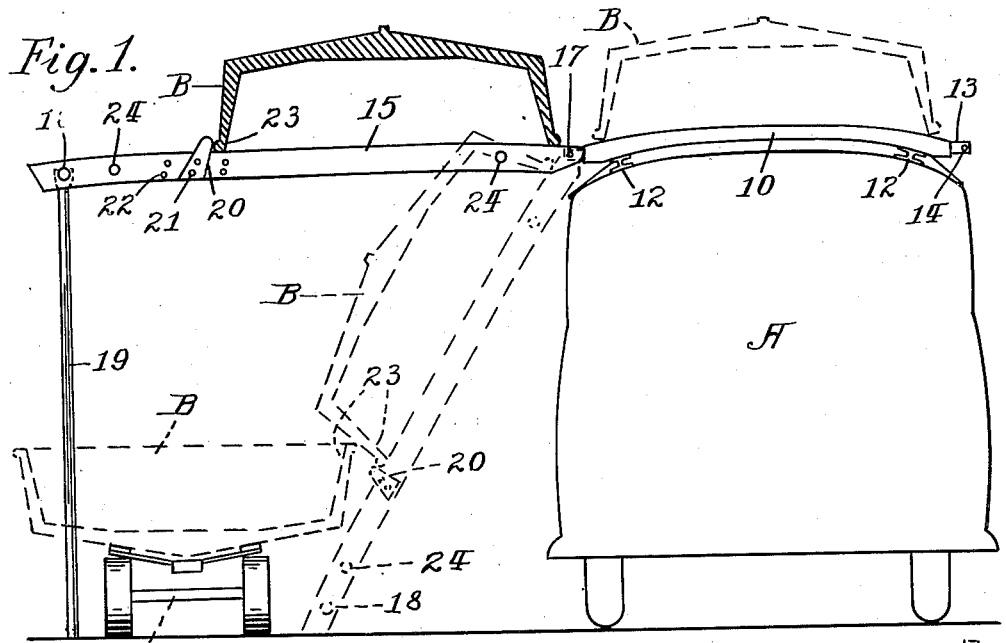
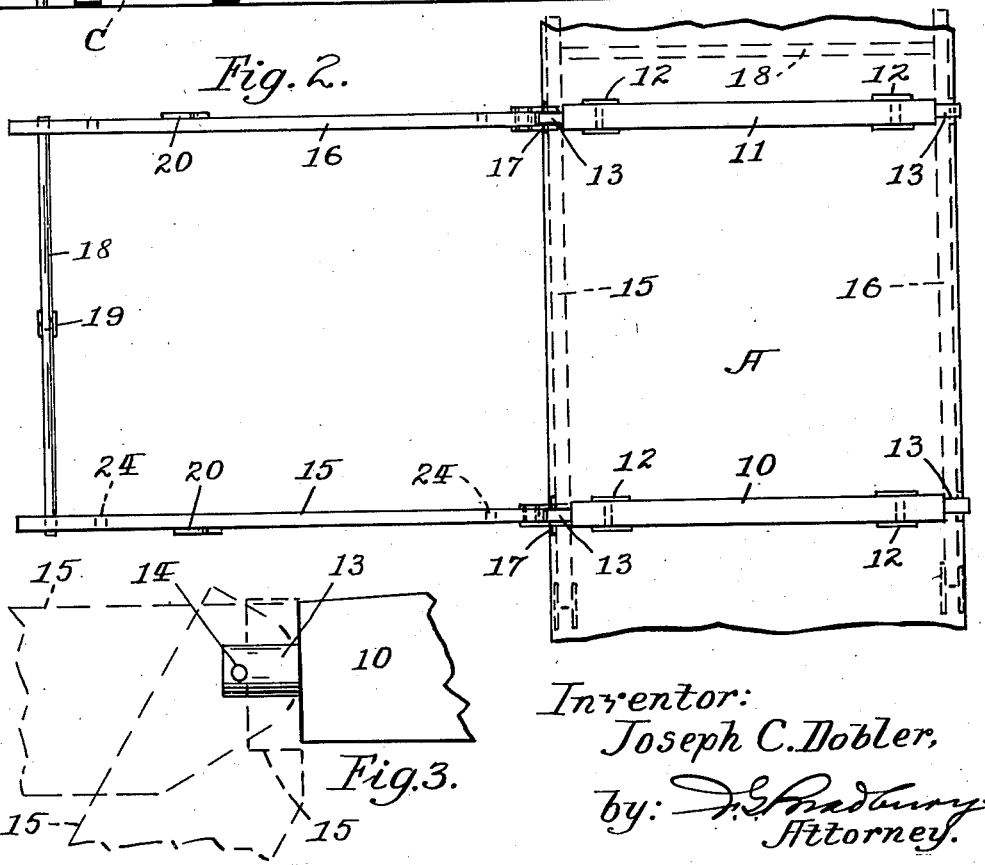
Inventor:
Joseph C. Dobler,
by: ␣␣␣␣␣␣␣
Attorney.

Patented Feb. 19, 1946

2,395,173

UNITED STATES PATENT OFFICE 2,395,173

LOADING AND UNLOADING APPARATUS

Joseph C. Dobler, Manhattan Beach, Calif.

Application September 22, 1944, Serial No. 555,315

3 Claims. (Cl. 214—77)

My invention relates to loading and unloading apparatus and more particularly has for its primary object to provide means for loading and unloading boats or other objects in relation to the top of a closed vehicle body. The device is designed so as to assist one man, to load a boat or other object onto the top of a passenger car, trailer or other vehicle so that it can be transported from place to place, or to unload the boat or other object from the top of the vehicle when reaching destination. By the use of my improved apparatus the operator can easily and quickly accomplish the desired results without marring or damaging either the vehicle or the object which is handled. Among further objects is the production of apparatus for accomplishing the above results which has maximum simplicity in construction and effectiveness in use.

In the accompanying drawing forming part of this specification, Fig. 1 is a front elevation showing my improved apparatus applied to the top of the body of a vehicle, the full line position showing the hinged loading rack supported in raised substantially horizontal position and a boat thereon in position to be shifted into loaded position on a platform which is secured on the top of the body, and the broken line position showing the rack in lowered position and the boat in various assumed positions during the process of loading or unloading; Fig. 2 is a plan of my improved apparatus which is shown in Fig. 1, the broken line position indicating the loading rack detached from loading position and secured to the load supporting members of the platform which are mounted on the top of the body in convenient position to be transported when not in active use; and Fig. 3 is a side elevation of a detail showing the separable joint means employed between the ends of the load supporting bars on the top of the body and the separable hinged rack which is employed for loading and unloading a boat or other object.

In the drawing, A represents a closed vehicle body which may resemble a self propelled passenger car, trailer or any other type of vehicle. More particularly, although not exclusively, the invention is applicable to the body of a passenger car or trailer, the object being to load or unload a boat or other object at one side or end of the vehicle so that it can be carried from place to place on the top of the body while the passengers ride inside. With this object in view I provide a pair or plurality of transverse supporting members which resemble bars 10 and 11. These bars extend across and are spaced transversely on the top of the vehicle body. They are secured rigidly to the top of the body by the pillar fixtures 12 or other suitable means and are curved slightly from end to end so as to substantially conform with the transverse curvature of the upper surface of the body. These bars are employed to support a boat such as B, as shown, or any other desired object, in inverted position slightly above the surface of the body A and constitute the equivalent of a platform. The opposite ends of each bar are provided with longitudinal studs 13, each of which has a transverse receiving socket 14 as will be hereinafter described.

Hingedly attached to the corresponding pair of ends of the supporting bars on either side of the vehicle body are two corresponding loading and unloading skid rails 15 and 16, which normally incline downwardly and outwardly from the vehicle body and rest on the ground or other supporting surface. The upper ends of these skid rails are freely hinged to the corresponding ends of the supporting bars by the studs 13 and readily removable pintles 17 which are inserted through the sockets 14 in said supports, whereby the skid rails can be easily and quickly connected or removed. The lower or outer ends of the skid rails are connected by a cross bar 18, by which they are held in parallel relation and can be raised by hand into the full line elevated position shown in Fig. 1 and supported by the removable leg or prop 19. The pair of skid rails 15 and 16 and cross bar 18 form a hinged rack for facilitating the loading and unloading of the boat or other load and can be attached to either pair of ends of the supporting bars to enable loading and unloading at either side of the vehicle as desired.

A shoulder piece 20 is fastened on the side near the lower end of each skid rail in suitable selected position by bolts 21 inserted through any set of bolt receiving openings 22 so that when the skid rails are supported in the broken line inclined position indicated in Fig. 1, with their lower ends planted upon the ground support, the rim 23 of the boat or the edge of an object which it is desired to unload from the truck C can be engaged by a pair of the shoulder elements 20 and lifted and turned by hand into inverted position upon the skid rails as indicated by the broken line position in Fig. 1. The boat or other object is thus retained on said rails by said shoulders during the loading operation. Following this step in the operation of loading a boat on the top of the body of the vehicle the skid rails with the boat loaded thereon are elevated into the substantially horizontal full line position shown in Fig. 1. The boat is then slid onto the supporting bars into the broken line position shown in Fig. 1, in which position it can be strapped or otherwise fastened and held while being transported by the vehicle.

After loading the boat the skid rails are uncoupled by removing the pintles 17 from the hinge connections and can be slid longitudinally across opposite ends of the supporting bars and fastened as shown by the broken lines in Fig. 2. When thus arranged suitable sockets 24 in the skid rails admit the studs 13, whereupon the pintles 17 are reinserted in the sockets 14 and serve to lock the skid rails on the ends of the supporting bars where they are retained while being transported from place to place ready for use when it is desired to unload the boat or other object. When unloading the boat or other load from the top of the body of the vehicle the operation is reversed, the skid rails forming the rack being attached in outstanding position on the ends of the supporting arms and the boat being slid onto said skid rails while the outer ends of the latter are supported by the leg or prop 19. The leg or prop is then removed and the rack lowered with the load thereon into inclined position with its lower ends resting upon the ground support. The boat or other load is then tilted or rolled over onto the bed of the truck C and the rack is detached.

The hinge joint between the end of each skid rail and the end of the corresponding supporting bar is shown in detail in Fig. 3, the skid rail 15 being shown by broken lines in its various positions when raised or lowered or when removed from its hinge connection and secured across the ends of the supporting bars when not in active service.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth without departing from the spirit of the invention and within the scope of the following claims.

I claim:

1. A loading and unloading apparatus for use in relation to the top of a closed body of a vehicle, comprising, laterally extending supporting bars secured rigidly across the top of the body, skid rails separably hinged to either of the opposite ends of said supporting bars at either selected side of the vehicle body and removable therefrom, said skid rails being foldable by their hinge connections into lowered inclined position with their outer ends resting upon a ground support and into upper substantially horizontal outstanding position at either selected side of the vehicle body, leg supporting means removably supporting the outer end portions of the skid rails in outstanding position, and shoulder means on said skid rails by which an object to be loaded or unloaded is engaged and held on the skid rails during their folding operation.

2. A loading and unloading apparatus for use in relation to the top of a vehicle body, comprising, laterally extending supporting bars secured rigidly across the top of said body, skid rails extending outwardly beyond the ends of said supporting bars at one side of the vehicle body, separable couplings between the opposite longitudinal ends of the supporting bars and the adjacent ends of said skid rails whereby said skid rails are foldably connected to the supporting bars at either selected side of the body and are movable either into lowered inclined position with their outer ends resting upon a ground support or into upper substantially horizontal outstanding position substantially level with said supporting bars, leg means for supporting the outer ends of said skid rails in outstanding position and fixed shoulder means on the outer end portions of said skid rails by which an object to be loaded or unloaded is engaged and held on the skid rails during their folding operation.

3. Loading and unloading apparatus for use in relation to the top of a vehicle body, comprising, platform means secured rigidly across the top of said body, skid rails extending outwardly beyond either selected side edge of the platform means, separable hinge connections between either side edge of said platform means and the adjacent ends of said skid rails by which the skid rails are foldable either into lowered inclined position at either side of said vehicle body with their outer ends resting upon a ground support to receive an object to be loaded or into upper outstanding position to permit the object to be readily slid onto or off of the platform means, and shoulder means on the outer ends of said skid rails by which the object to be loaded or unloaded is engaged and retained on the skid rails during their folding operation.

JOSEPH C. DOBLER.